UNITED STATES PATENT OFFICE 2,121,723

ARALKYL ETHERS

Shailer L. Bass, Midland, and Edward M. Van Duzee, deceased, late of Midland, Mich., by Clarence H. Macomber, administrator, Midland, Mich., assignors to The Dow Chemical Company, Midland, Mich., a corporation of Michigan No Drawing. Application June 10, 1937, Serial No. 147,474

12 Claims. (Cl. 260—150)

The present invention concerns the aralkyl ethers of the mono-alkyl and mono-alkoxy phenols and their nuclear halogenated substitution products having the following general structural formula:

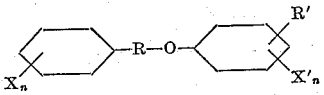

wherein X and X' each represent a substituent selected from the group consisting of halogen and hydrogen, each $n$ is an integer not greater than 2, R represents an alkylene radical, and R' represents a substituent selected from the group consisting of the alkyl and alkoxy radicals containing at least three carbon atoms.

Certain of the above compounds have been prepared, and the physical properties thereof determined whereby they may be readily identified. These compounds are particularly useful as intermediates for the manufacture of pharmaceuticals and as plasticizing agents for cellulose derivatives such as ethyl cellulose, cellulose acetate, etc. The invention, then, consists in the new products hereinafter fully described and particularly pointed out in the claims.

The new compounds can be prepared by treating the alkali metal salt of an alkyl or alkoxy phenol compound or a nuclear halogenated substitution product thereof with an aralkyl halide.

For example, an alkyl or alkoxy phenol compound is added to an alcoholic solution of metallic sodium to form the corresponding alcoholic sodium phenolate solution. An aralkyl halide is introduced slowly into said phenolate solution maintained at its reflux temperature whereby the desired ether product is formed. The reaction mixture is then cooled and diluted with several volumes of water to precipitate the crude ether product which may thereafter be recovered in any convenient manner, e. g. by extraction with an organic solvent, decantation, etc. The crude product so obtained is washed with water to remove inorganic halides therefrom, and distilled or fractionally crystallized to obtain the desired ether in a substantially pure form.

These new ether derivatives may also be obtained by reacting an alkyl or alkoxy phenol compound with an aralkyl halide in the presence of an aqueous alcoholic solution of sodium hydroxide or other suitable alkali.

Example 1

9.2 grams (0.4 mole) of metallic sodium were digested with 350 milliliters of absolute alcohol, and 65.6 grams (0.4 mole) of 4-tertiary-amyl-phenol reacted therewith to form an alcoholic solution of sodium 4-tertiary-amyl-phenolate. This phenolate solution was warmed to its refluxing temperature and 50.6 grams (0.4 mole) of benzyl chloride added thereto over a period of thirty minutes. Refluxing was continued thereafter for one hour under atmospheric pressure, after which the reaction mixture was cooled, whereby an impure benzyl ether of 4-tertiary-amyl-phenol product crystallized therefrom. The entire reaction mixture was heated to the melting point of the ether product therein, diluted with 900 milliliters of water, and extracted with benzene. This benzene extract was washed with water to remove suspended sodium chloride, filtered, and the benzene removed by distillation at atmospheric pressure. A dark, viscous residue obtained thereby was fractionally distilled under reduced pressure, whereby there were obtained 65.5 grams (0.26 mole) of the benzyl ether of 4-tertiary-amyl-phenol as a white, crystalline product melting at 60°–61° C. (uncorrected).

Example 2

In a similar manner 76 grams (0.558 mole) of 2-isopropyl-phenol, 12.8 grams (0.558 mole) of metallic sodium, and 70.6 grams (0.558 mole) of benzyl chloride were reacted together whereby there was obtained a crude reaction product which was diluted with water and extracted with benzene. The benzene extract was fractionally distilled under reduced pressure yielding 81 grams of the benzyl ether of 2-isopropyl-phenol as a colorless liquid boiling at 152°–155° C. at 3 millimeters pressure, and having a specific gravity of 1.029 at 20°/4° C.

In a similar manner, other aralkyl ethers of the alkyl and alkoxy phenols were prepared, of which the following are representative:

Benzyl ether of 4-isopropyl-phenol, a substantially colorless liquid boiling at 158°–160° C. at 3 millimeters pressure, and having the specific gravity 1.023 at 20°/4° C.

Benzyl ether of 4-tertiary-octyl-phenol, a white crystalline solid, boiling at 197°–199° C. at 5 millimeters pressure, and melting at 101.5°–103.5° C. (uncorrected).

Among the compounds which may be prepared by substituting other aralkyl halides for those employed in the foregoing examples are 4-bromo-benzyl ether of 2-isopropyl-phenol, 2,4-dichloro-benzyl ether of 4-normal-propyl-phenol, phenyl-ethyl ether of 4-tertiary-octyl-phenol, phenyl-normal-hexyl ether of 3-secondary-butyl-phenol, etc. Likewise, by substituting other phenols for those disclosed above, compounds may be prepared such as 4-iodo-benzyl ether of 2-chloro-4-tertiary-butyl-phenol, benzyl ether of 4-normal-amyl-phenol, 3-chloro-benzyl ether of 2-normal-hexyl-phenol, 2-chloro-4-bromo-benzyl ether of 2-propyloxy-phenol, 3-bromo-phenyl-propyl ether of butyloxy-phenol, benzyl ether of 2-propyloxy-4-bromo-phenol, phenyl-amyl ether of 2,4-dichloro-6-tertiary-butyl-phenol, benzyl ether of 2,6 - dibromo - 4 - normal - octyl-phenol, benzyl ether of 2-chloro-6-bromo-4-secondary-amyl-phenol, phenyl-ethyl ether of 3-amyloxy-4,6-dibromo-phenol, etc. In place of the sodium phenolates employed in the above examples, other alcohol soluble metallic phenolates may be employed, e. g. the potassium compounds, etc.

Other modes of applying the principle of the invention may be employed instead of those explained, change being made as regards the materials employed, provided products described in the following claims be thereby obtained.

We therefore particularly point out and distinctly claim as the invention:

1. A compound having the formula

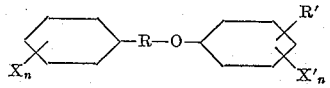

wherein X and X' each represent a member of the group consisting of the halogens and hydrogen, each $n$ is an integer not greater than 2, R represents an alkylene radical, and R' represents a substituent selected from the group consisting of the alkyl and alkoxy radicals containing at least 3 carbon atoms.

2. A compound having the formula

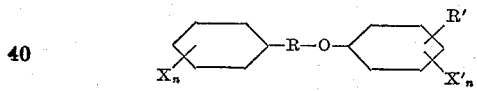

wherein X and X' represent halogen, each $n$ is an integer not greater than 2, R represents an alkylene radical containing from 1 to 8 carbon atoms, inclusive, and R' represents a substituent selected from the group consisting of the alkyl and alkoxy radicals containing from 3 to 8 carbon atoms, inclusive.

3. A compound having the formula

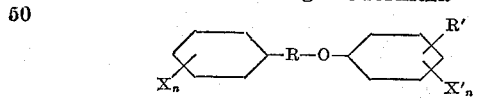

wherein X and X' each represent a member of the group consisting of the halogens and hydrogen, each $n$ is an integer not greater than 2, R represents an alkylene radical containing from 1 to 8 carbon atoms, inclusive, and R' represents a substituent selected from the group consisting of the alkyl and alkoxy radicals containing from 3 to 8 carbon atoms, inclusive.

4. A compound having the formula

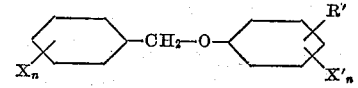

wherein X and X' each represent a member of the group consisting of the halogens and hydrogen, each $n$ is an integer not greater than 2, and R' represents a substituent selected from the group consisting of the alkyl and alkoxy radicals containing at least 3 carbon atoms.

5. A compound having the formula

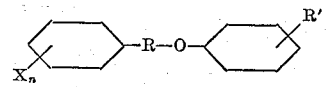

wherein X represents halogen, $n$ is an integer not greater than 2, R represents an alkylene radical, and R' represents a substituent selected from the group consisting of the alkyl and alkoxy radicals containing at least 3 carbon atoms.

6. A compound having the formula

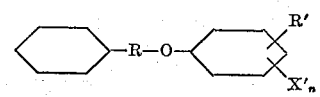

wherein X' represents halogen, $n$ is an integer not greater than 2, R represents an alkylene radical, and R' represents a substituent selected from the group consisting of the alkyl and alkoxy radicals containing at least 3 carbon atoms.

7. A compound having the formula

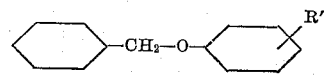

wherein R' represents an alkyl group containing at least three carbon atoms.

8. A compound having the formula

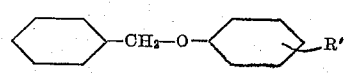

wherein R' represents an alkyl group containing from 3 to 8 carbon atoms, inclusive.

9. A benzyl ether of an isopropyl-phenol compound having the formula

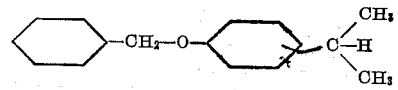

10. Benzyl ether of 2-isopropyl-phenol.
11. Benzyl ether of 4-isopropyl-phenol.
12. Benzyl ether of 4-tertiary-amyl-phenol.

SHAILER L. BASS.
CLARENCE H. MACOMBER,
*Administrator of the Estate of Edward M. Van Duzee, Deceased.*